(12) United States Patent
Dries et al.

(10) Patent No.: US 6,618,129 B2
(45) Date of Patent: Sep. 9, 2003

(54) TECHNIQUE FOR COMBINED SPECTRAL, POWER, AND POLARIZATION MONITORING

(75) Inventors: J. Christopher Dries, Princeton, NJ (US); Marshall Cohen, Princeton Junction, NJ (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/828,025

(22) Filed: Apr. 6, 2001

(65) Prior Publication Data

US 2002/0060785 A1 May 23, 2002

Related U.S. Application Data

(60) Provisional application No. 60/196,032, filed on Apr. 7, 2000.

(51) Int. Cl.[7] ............................................. G01N 21/00
(52) U.S. Cl. ...................................................... 356/73
(58) Field of Search .......................... 356/73, 327, 328, 356/326, 225–226, 319

(56) References Cited

U.S. PATENT DOCUMENTS

| 4,758,086 A | 7/1988 | Sonobe et al. |
| 5,796,479 A | 8/1998 | Derickson et al. |
| 5,850,292 A | 12/1998 | Braun |

FOREIGN PATENT DOCUMENTS

| JP | 35-817-2536 | * 10/1983 | .......... G01N/21/25 |

* cited by examiner

Primary Examiner—Tu T. Nguyen
(74) Attorney, Agent, or Firm—Woodbridge & Associates, PC; Richard C. Woodbridge, Esq.; Roy Rosser

(57) ABSTRACT

An apparatus for use in wave division multiplexing optical telecommunication systems includes a dual photodiode array which converts parallel and perpendicularly polarized light beams at given wavelengths to electrical signals which are digitized and used to rapidly and simultaneously determine all wavelengths and associated components of power and angle of polarization. This information can be displayed for monitoring purposes, or can be used to control signals travelling through optical fiber.

15 Claims, 3 Drawing Sheets

TECHNIQUE FOR COMBINED SPECTRAL, POWER, AND POLARIZATION MONITORING

This application claims the benefit of Provisional Application No. 60/196,032, filed Apr. 7, 2000.

BACKGROUND OF THE INVENTION

1. Field of the Invention

The present invention relates generally to optical signal monitoring, and, more particularly, to an apparatus and a method for simultaneously monitoring and controlling a plurality of wavelengths and associated components of power and polarization of multiple optical channels in a wavelength division multiplexing network.

2. Description of Related Art

Optical networking technology currently provides for fast, efficient transport of data over fiber-optic lines via transmission of information as pulses of light through hair-thin strands of ultra-pure glass. Transmitting information on multiple wavelengths of light is referred to as Wavelength Division Multiplexing (WDM). In a WDM system, the signals emanating from lasers at different wavelengths are transmitted simultaneously through a single optical fiber. Because the intensities of these signals are attenuated during transmission, they must be amplified periodically. This is commonly accomplished using an erbium-doped fiber amplifier or EDFA. Scattering in the fiber, absorption by impurities, and amplification bands in the erbium-doped fiber limit the useful wavelength bands. Typical useful bands, such as the C-band, are approximately 35 nm wide (e.g. wavelengths from 1530 nm to 1565 nm). In a standard WDM system, the channel frequencies are spaced 100 GHz apart or approximately 0.8 nm in wavelength. As currently practiced, information is transmitted in very closely spaced wavelengths, a technique referred to as Dense Wave Division Multiplexing (DWDM), in which the frequency spacing is 50 GHz or approximately 0.4 nm in wavelength.

These wavelength spacings are tighter than the manufacturing tolerances of semiconductor lasers. The situation is further complicated by the wavelength drift that occurs with changing temperature and drive current. For a WDM system to operate properly, the laser wavelengths must be monitored and controlled.

It is equally important to monitor the polarization angle of each optical channel. Due to birefringence in the fiber, light with different polarizations travels at different velocities, resulting in polarization mode dispersion, which produces pulse broadening and distortion, and leads to performance degradation.

There are a number of methods for measuring the wavelengths of the optical channels. The simplest is the use of a scanning monochrometer, which separates or disperses wavelengths by means of a prism or grating. A slit allows only a narrow wavelength band to strike a detector. The prism or grating is rotated so that successive measurements of the intensity are made at different wavelengths. Because a complete spectrum is created one wavelength at a time, the method is slow. It is also unreliable due to the requirement for moving parts.

A second technique uses a Fabry-Perot interferometer as a replacement for the prism or grating. While substantially smaller than a scanning monochrometer, a Fabry-Perot-based system suffers from the same limitations of lack of speed and reliability.

The most commonly used wavelength monitor is the photodiode array spectrometer, which uses a prism or grating to disperse the wavelength of light. Instead of selecting individual wavelengths using a slit in front of a single detector, the entire spectrum is allowed to impinge on a compact array of photodiodes. The physical size of each photodiode in the array is equivalent to the width of the slit with the result that all of the wavelengths are measured simultaneously. The resultant increase in speed is coupled with increased reliability due to the lack of moving parts.

Recently, alternative techniques have been developed for the measurement of wavelength in DWM systems. Braasch, Holzapfel and Neuschaefer-Rube, for example, in an article entitled "Wavelength Determination of Semiconductor Lasers; Precise but Inexpensive", Optical Engineering, vol 34, pp. 1417–1420 (1995), describe a technique for determining wavelength by means of measuring the wavelength dependent responsivity of two photodiodes vertically integrated into a common substrate. In U.S. Pat. No. 5,850,292, Braun describes a wavelength monitor which detects wavelength drifts of component channel signals within a multi-wavelength light signal by means of cascading band filters. In U.S. Pat. No. 5,796,479, Derickson and Jungerman describe a WDM optical telecommunications network including a signal monitoring apparatus employed to monitor wavelength, power and signal-to-noise ratio. These and all of the above techniques, however, share a common limitation in that they do not determine the polarization state of the light.

There are several techniques for determining the angle of polarization of light. The most common uses a polarization filter and a single detector, and makes two measurements with the polarizing filter in two orthogonal orientations. The ratio of the two measurements is the tangent of the polarization angle. The $$\text{quadrature sum} = \sqrt{M_1^2 + M_2^2}$$

is the intensity. In a second approach, a birefringent crystal separates the light into its polarization components that then impinge on two separate detectors. The determination of polarization and total intensity proceed as with the polarizing filter technique with the exception that instead of two measurements with a single detector there is a single measurement with two detectors. While capable of determining polarization state, these techniques are incapable of determining wavelength.

Precise monitoring of light properties is critical to maintaining WDM systems in proper operating order, and current WDM systems incorporate spectral monitoring systems at various nodes within communications networks. Feedback to control systems built into the optical networking system must allow for correction of signals within milliseconds. Using present day techniques, however, power as a function of wavelength, and state of polarization are determined separately.

Currently, there is no method available for simultaneous measurement of the state of polarization of light in addition to measurement of wavelength and spectral power in WDM systems. Although bench-top analytical spectrometers that measure power and polarization relative to the wavelength light being monitored are known, they are unsuitable for use in WDM systems. U.S. Pat. No. 4,758,086, for example, describes such a spectrometer in which diffracted light is passed through a calcite polarization element, from which two components of polarized light emerge and then pass through two half-mirrors, two lenses, and four photodetectors, all adjustably mounted on a base, and a set of filters. This spectrometer is totally unsuitable for use in monitoring in WDM systems. It is large, unstable because of moving parts, and too slow for use on the WDM system timetable because it uses a rotating diffraction grating to disperse light, and measures wavelengths sequentially over a period of minutes.

Accordingly there is a need for a compact apparatus for simultaneously and rapidly measuring a plurality of wavelengths and associated components of power and polarization in WDM systems. Such an apparatus would obviate the need for two separate measurements, thereby reducing the time required to make a complete set of determinations. It would also reduce the total space required for monitoring devices, the power input to run them, and the amount of light needed to be tapped for measurement. Insofar as can be determined, none of the relevant literature suggests the use of a dual diode array having two individual photodiode arrays on the same semiconductor die in a system which simultaneously monitors a plurality of wavelengths and associated components of power and polarization.

SUMMARY OF THE INVENTION

Briefly described, the invention comprises an apparatus for simultaneously measuring a plurality of wavelengths and associated components of power and angle of polarization of a light beam that employs a separating means for separating a light beam into its respective wavelength components, a polarizing means for separating the separated wavelength components into two polarized beam components, a dual photodiode array comprising two individual photodiodes on the same semiconductor die for detecting the separated parallel and perpendicularly polarized beam components and converting each to electrical signals, a means for digitizing the electrical signals, and a means for deriving, controlling and optionally displaying a plurality of wavelengths and associated components of power and angle of polarization.

The invention also comprises a method for simultaneously measuring a plurality of wavelengths and associated components of power and angle of polarization of a light beam, comprising the steps of separating a light beam into its respective wavelength components, separating the separated wavelength components into two polarized beam components, detecting the separated parallel and perpendicularly polarized beam components and converting each to electrical signals by means of a dual photodiode array comprising two individual photodiodes on the same semiconductor die, digitizing the electrical signals, and deriving, controlling and optionally displaying a plurality of wavelengths and associated components of power and angle of polarization.

This invention may be more fully understood by reference to the following drawings.

DETAILED DESCRIPTION OF THE INVENTION

During the course of this description, like numbers will be used to identify like elements according to the different figures which illustrate the invention.

Figure 1:
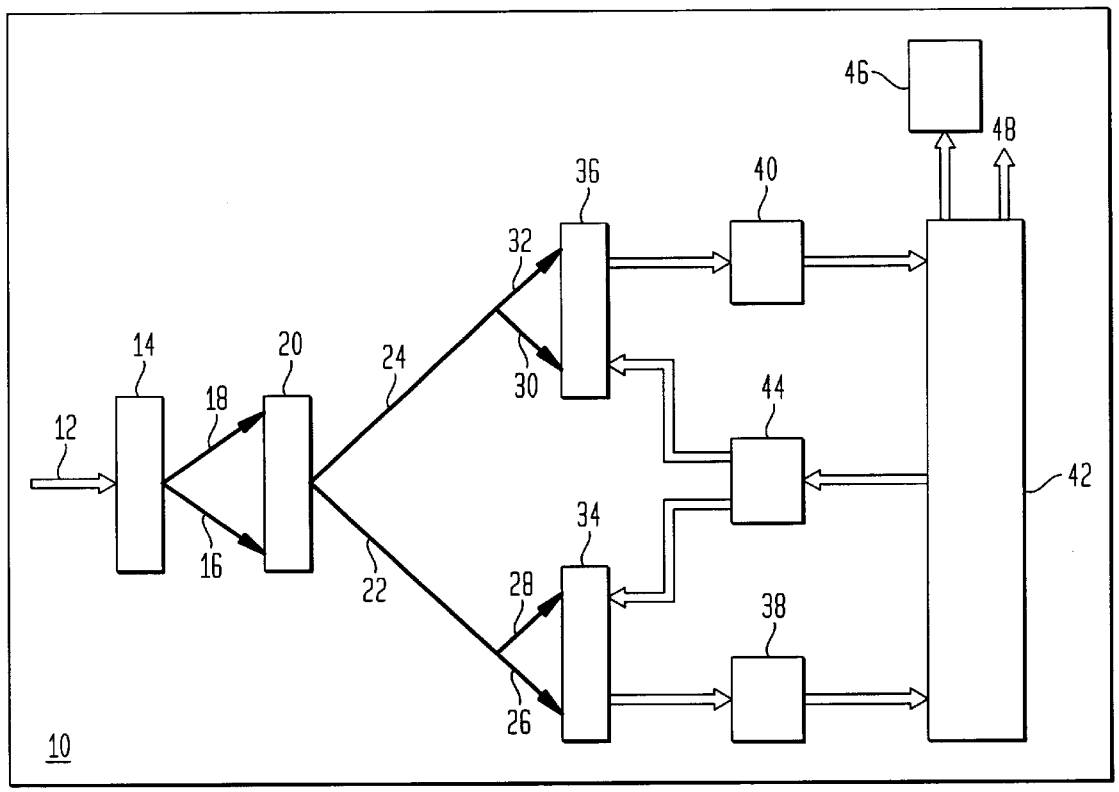
FIG. 1 is a block diagram of a preferred embodiment of the invention.

FIG. 1 depicts a block diagram of a preferred embodiment 10 of this invention. A light beam 12 from an optical fiber is passed through a dispersive element 14 to separate it unidirectionally into its wavelength components, ranging from the shortest 16 to the longest 18. Examples of dispersive elements 14 suitable for use in the present invention include but are not limited to a concave holographic grating, a plane reflection grating, an Echelle grating, a transmission grating, a prism, a grating/prism (GRISM), or a fiber Bragg grating. When the dispersive element 14 is a grating, the input light beam 12 must precisely fill the grating. Wavelength separation in a grating is due to the interference pattern that results when the transmitted or reflected light travels different path lengths. When all of the slits in the grating are not illuminated, or when the input light beam 12 overfills the grating, spectral resolution is degraded.

Each of these wavelength-dispersed beams ranging from 16 to 18 is then passed through a polarizing element 20. Polarizing elements are typically birefringent crystals such as calcite or liquid crystals, and have the property that the index of refraction is different for light with polarizations parallel to different crystal axes. As is well known, when light passes from a first medium (with index of refraction $n_1$) to a second medium (with index of refraction $n_2$), the light bends according to Snell's law:

$$\frac{\sin(\alpha_1)}{\sin(\alpha_2)} = \frac{n_2}{n_1}.$$

The angle $\alpha_1$ is the angle the incident light (in medium 1) makes with the normal to the interface between the media and $\alpha_2$ is the angle of the transmitted light. In a birefringent material, the index of refraction depends on the polarization of the light. In calcite, for example, the two principle indices of refraction are 1.658 and 1.485. If light enters a 1 cm thick crystal of calcite at an angle of 35° to the normal, the two polarization states will exit 0.5 mm apart.

Each of these wavelength-dispersed beams, ranging from 16 to 18, is passed through the polarizing element 20 to separate each of the dispersed beams into a parallel polarized beam 22, ranging from the shortest wavelength beam 26 to the longest wavelength beam 28, and a perpendicularly polarized beam 24, ranging from the shortest wavelength beam 30 to the longest 32. Both parallel polarized beam 22 and perpendicularly polarized beam 24 maintain the original wavelength dispersion resulting from passing light beam 12 through dispersive element 14. Each parallel polarized beam and perpendicularly polarized beam is then sent to photodiode arrays 34 and 36 respectively, for detection and conversion to electrical signals. The outputs of the photodiode arrays 34 and 36 are digitized by analog-to-digital converters 38 and 40, respectively. Alternatively, a single analog-to-digital converter can be shared between the two outputs of arrays 34 and 36. The overall system is under central management of system electronics 42. System electronics 42 manages central control electronics 44, which operates the photodiode arrays 34 and 36. The results of the processing are available for both display 46 and control purposes 48 as will be later explained.

Figure 2:
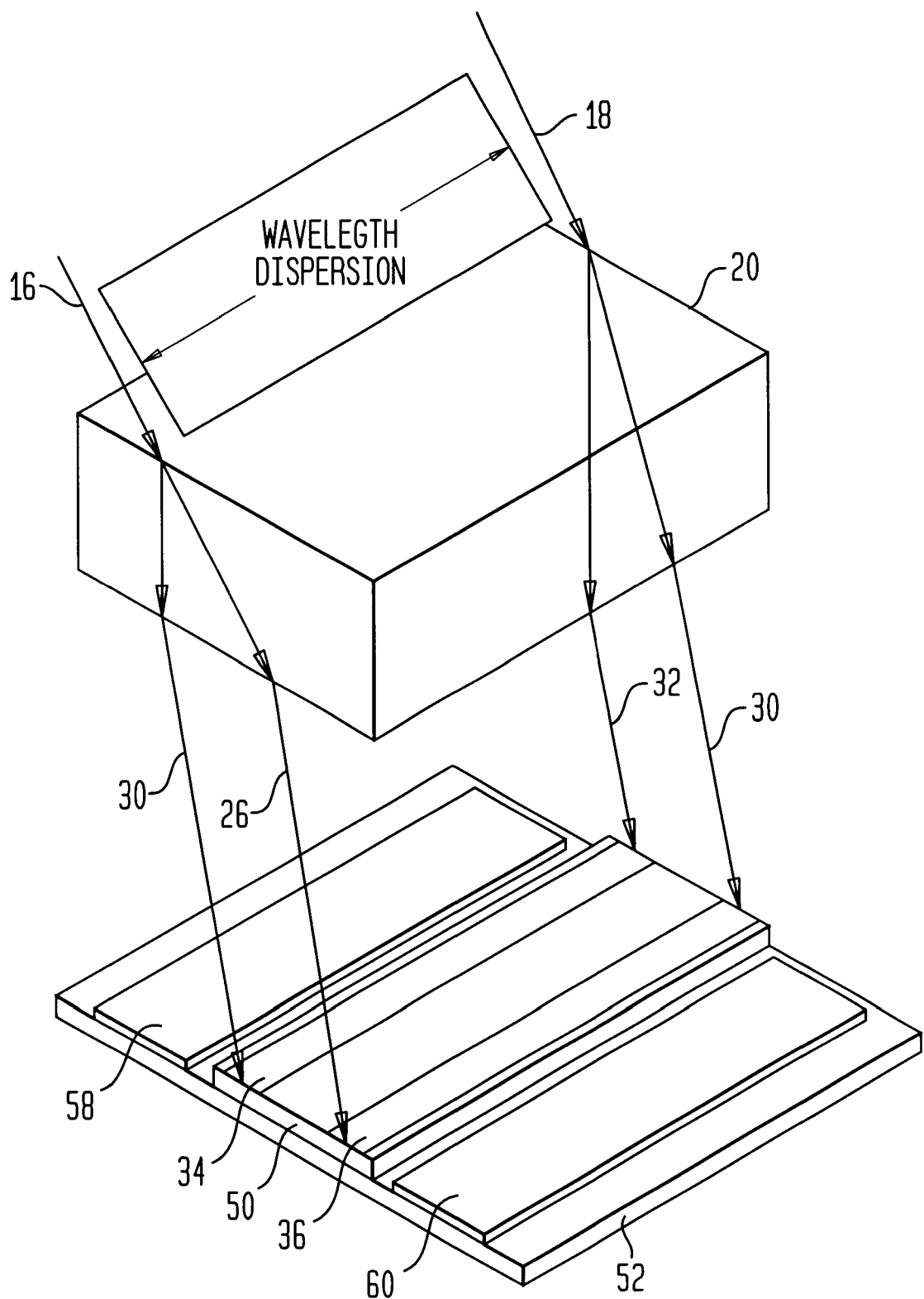
FIG. 2 depicts the orientation of the dual photodiode array relative to the dispersed polarized beams in the embodiment of FIG. 1.

FIG. 2 schematically depicts the orientation of a dual photodiode array 50 relative to the incident wavelength dispersed and polarized light beam in the embodiment of FIG. 1. The dual photodiode array 50 contains the two parallel linear photodiode arrays 34 and 36 fabricated monolithically on the same semiconductor die 52 to assure precise physical alignment. The linear photodiode arrays 34 and 36 are oriented with the array directions parallel to the direction of the wavelength dispersion as shown.

Figure 3:
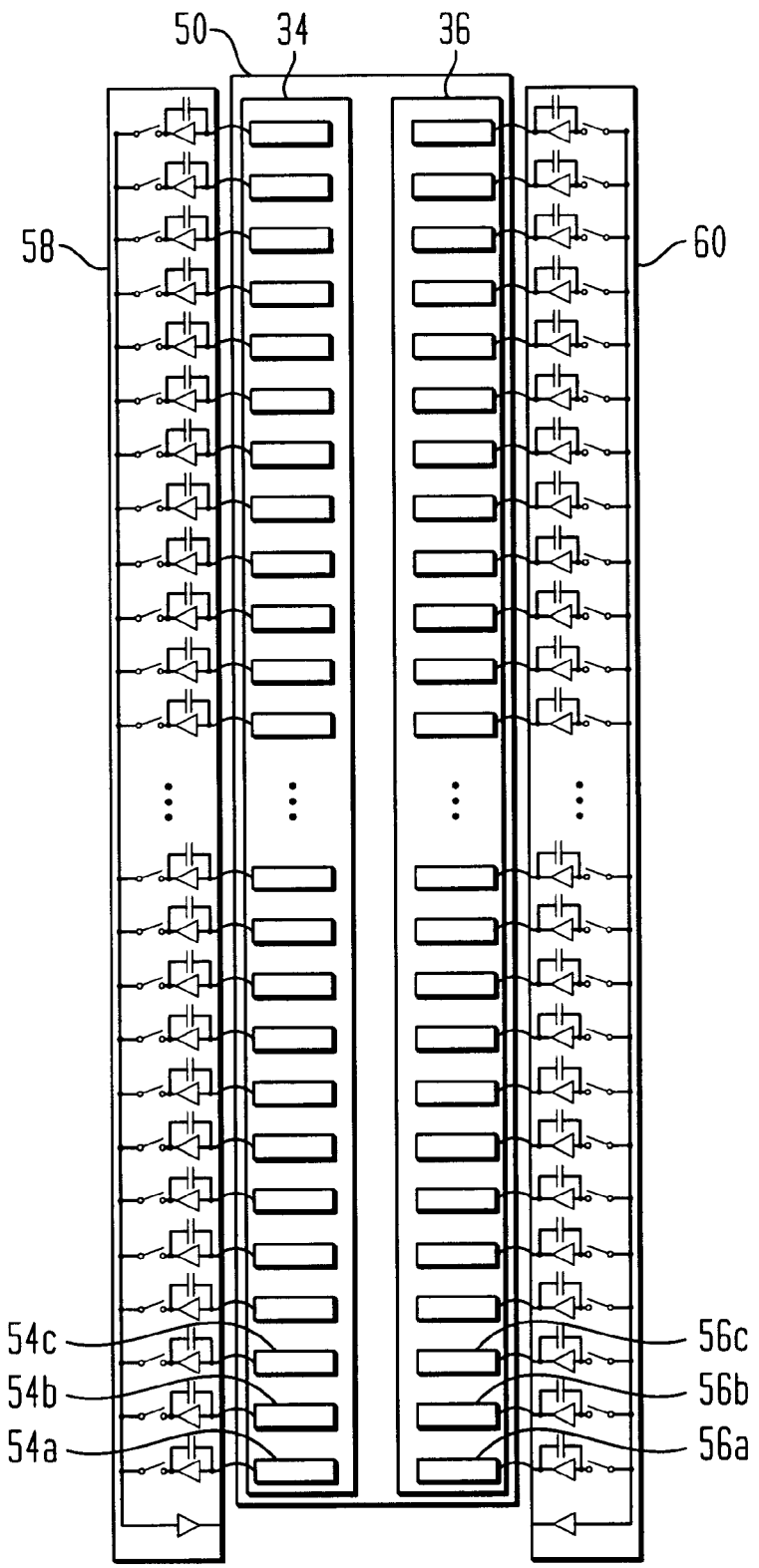
FIG. 3 shows individual photodiodes on two parallel linear photodiode arrays in the embodiment of FIG. 1.

A representative dual photodiode array 50 of the embodiment of FIG. 1 and FIG. 2 is illustrated in more detail in FIG. 3. Linear photodiode arrays 34 and 36 have a plurality of individual photodiodes 54a, b, c, etc. and 56a, b, c, etc., respectfully, each sensitive to a wavelength band of interest. The choice of photodiode semiconductor material depends on the wavelength band to be measured. Examples include, but are not limited to, indium gallium arsenide, silicon, indium antimonide, and mercury cadmium telluride. Readout integrated circuits 58 and 60 are silicon CMOS (Complementary Metal Oxide Silicon Transistor) integrated circuits. In alternative embodiments, the readout integrated circuits 58 and 60 may be in other electronic architectures such as but not limited to GaAs MESFET (Metal Semiconductor Field Effect Transistor), or may be monolithically integrated with the photodiode arrays 34 and 36 or there may be no readout integrated circuits at all with readout implemented with external discrete components.

The signal detected by each photodiode 54 in linear photodiode array 34 corresponds to the intensity of one parallel polarization component at a single wavelength. The signal detected by the corresponding photodiode 56 in photodiode array 36 corresponds to the intensity of the perpendicular polarization at the same wavelength. The sum of the signals striking corresponding photodiodes 54 and 56 indicates the power. The ratio of the signals striking corresponding photodiodes 54 and 56 is the tangent of the polarization angle.

The outputs of the two photodiode arrays 34 and 36 are processed by the system electronics 42 (FIG. 1) to derive a plurality of wavelengths and associated components of total power, and angle of polarization. The signal from each photodiode 54 and 56 represents the signal at a single wavelength for a single polarization of the light. The angle of polarization may be given by:

$$\alpha_{pol} = \tan^{-1}\left(\frac{I_{parallel}}{I_{perpindicular}}\right)$$

where $I_{parallel}$ and $I_{perpendicular}$ are the intensities measured by the photodiode arrays of the light with polarization parallel and perpendicular to the optical axes of the birefringent medium. The absolute intensity of the light may be given by:

$$I_{total} = \sqrt{I_{parallel}^2 + I_{perpendicular}^2}.$$

As each pair of photodiodes 54 and 56 represent a single wavelength, application of this analysis to all of the photodiodes from the two arrays 34 and 36 generates a complete spectrum. The results of the processing from system electronics 42 are available both for display 46 and for control 48. This apparatus can thus be used to monitor and control the optical integrity of a wavelength division multiplexing network through display 46 and control 48.

While the invention has been described with reference to a preferred embodiments thereof, it will be appreciated by one of ordinary skill in the art that modifications can be made to the elements of the invention without departing from the spirit and scope of the invention as a whole.

What is claimed is:

1. An apparatus for simultaneously measuring and controlling a plurality of wavelengths of a light beam, and associated components of power and angle of polarization of said wavelength of said light beam comprising:

separating means for separating a light beam into two or more wavelength bands of interest;

polarizing means for separating said two or more wavelength bands of interest into parallel and perpendicularly polarized beam components;

dual photodiode array comprising a first linear photodiode array for detecting said parallel polarized beam components, and a second linear photodiode array for detecting said perpendicularly polarized beam components, said first and second linear photodiode arrays being fabricated monolithically on the same semiconductor die and oriented parallel to the direction of the wavelength dispersion;

means to convert said parallel and said perpendicularly polarized beams to electrical signals;

means for digitizing said electrical signals;

means for deriving, substantially simultaneously, a representative single wavelength and associated components of power and angle of polarization of each of said two or more wavelength bands of interest from said digitized signals, and means for controlling said representative single wavelength and associated components of power and angle of polarization of each of said two or more wavelength bands of interest of said light beam.

2. The apparatus of claim 1 further comprising means for displaying said derived single wavelength and associated components of power and angle of polarization of said wavelengths of each of said two or more wavelength bands of interest of said light beam.

3. The apparatus of claim 1 wherein said separating means is chosen from the group consisting of a plane reflection grating, a transmission grating, a Fiber Bragg grating, an Echelle grating, and a prism.

4. The apparatus of claim 1 wherein said polarizing means is chosen from the group consisting of a birefringent crystal and a liquid crystal.

5. The apparatus of claim 4 wherein said birefringent crystal is calcite.

6. The apparatus of claim 1 wherein said first and said second linear photodiode arrays are comprised a plurality of photodiodes made of semi-conducting material.

7. The apparatus of claim 6 wherein said semi-conducting material is chosen from the group consisting of indium gallium arsenide, silicon, induim antimonide and mercury cadmium telluride.

8. A method for simultaneously measuring and controlling said a plurality of wavelengths of said light beam and associated components of power and wavelength, power and angle of polarization of said wavelengths of said light beam comprising the steps of:

a) separating said light beam into two or more wavelength bands of interest;

b) separating said two or more wavelength bands of interest into parallel polarized beam components, and perpendicularly polarized beam components;

c) detecting a given number of said parallel polarized beam components, and a corresponding given number of said perpendicularly polarized beam components and said parallel and said perpendicularly polarized in to electrical signals;

d) digitizing said electrical signals;

e) deriving, substantially simultaneously, a representative single wavelength and associated components of power and angle of polarization of each of said two or more wavelength bands of interest of said light beam from said digitized signals, and f) controlling said representative single wavelength and associated components of power and angle of polarization of each of said two or more wavelength bands of interest of said light beam.

9. The method of claim 8 further comprising displaying said single wavelength and associated components of power and angle of polarization of each of said two or more wavelength bands of interest of said light beam.

10. The method of claim 8 wherein said detecting is done by means of a dual photodiode array comprising a first linear photodiode for detecting said parallel polarized beam components, and a second linear photodiode for detecting said perpendicularly polarized beam components, wherein said first and second linear photodiode arrays are fabricated monolithically on the same semiconductor die oriented parallel to the direction of the wavelength dispersion.

11. The method of claim 8 wherein said separating is done with a plane reflection grating, a transmission grating, a Fiber Bragg grating, an Echelle grating, or a prism.

12. The method of claim 8 wherein said polarizing is done with a birefringent crystal or a liquid crystal.

13. The method of claim 12 wherein said birefringent crystal is calcite.

14. The method of claim 8 wherein said first and said second linear photodiode array are comprised of a plurality of photodiodes made of a semi-conducting material.

15. The method of claim 14 wherein said semi-conducting material is chosen from the group consisting of indium gallium arsenide, silicon, induim antimonide or mercury cadmium telluride.

* * * * *